L. H. YOURTREE.
GASOLENE FILTER.
APPLICATION FILED MAY 9, 1912.
1,058,133.
Patented Apr. 8, 1913.
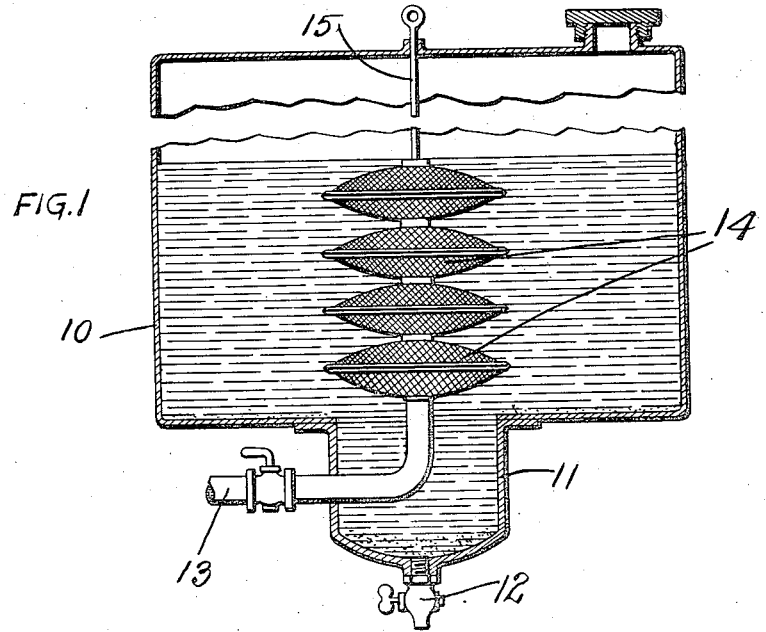
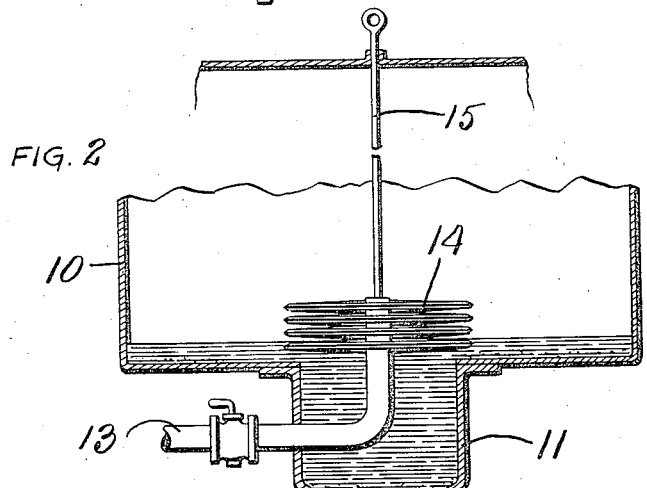
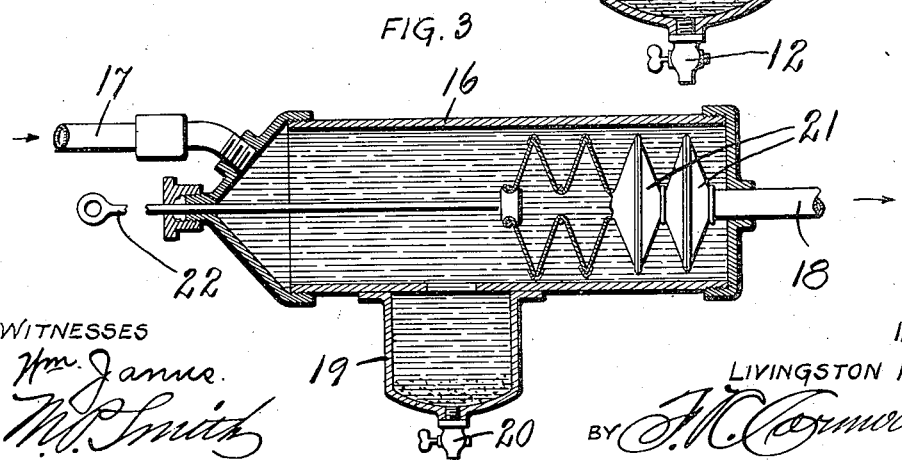
WITNESSES
INVENTOR
LIVINGSTON H. YOURTREE
BY ATT'Y.

UNITED STATES PATENT OFFICE.

LIVINGSTON H. YOURTREE, OF CHESTER, ILLINOIS.

GASOLENE-FILTER.

1,058,133.  Specification of Letters Patent.  Patented Apr. 8, 1913.

Application filed May 9, 1912. Serial No. 696,159.

*To all whom it may concern:*

Be it known that I, LIVINGSTON H. YOURTREE, a citizen of the United States, residing at Chester, Randolph county, Illinois, have invented a certain new and useful Improvement in Gasolene-Filters, of which the following is a full, clear, and exact description, such as will enable others skilled in the art to which it appertains to make and use the same, reference being had to the accompanying drawings, forming part of this specification.

My invention relates to new and useful improvements in filters particularly intended for use in gasolene tanks, although, with slight modifications, the filter can be advantageously utilized in connection with gasolene conveying tubes and pipes, and particularly the pipe or tube utilized between a supply tank and carbureter.

The principal object of my invention is to arrange a simple filtering member preferably in the form of a series of hollow collapsible disks of suitable filtering material, such as fine wire gauze, chamois-skin or fabric within a gasolene tank, which filtering member is attached to the outlet of the tank preferably at a point above the bottom of said tank, in order to thoroughly and effectually filter all of the gasolene that is drawn from the tank and prevent water, sediment and the like, from entering the outlet pipe and the carbureter attached thereto.

A further object of my invention is to provide means for expanding and collapsing the filtering member from the exterior of the tank or housing in which it is located, which action is necessary to cleanse the filtering surfaces from sediment and the like.

To the above purposes my invention consists in certain novel features of construction and arrangement of parts hereinafter more fully described, claimed and illustrated in the accompanying drawings, in which,—

Figure 1 is a vertical section taken through the lower portion of a gasolene tank and showing my improved filter positioned therein. Fig. 2 is a sectional view similar to Fig. 1 and showing the filtering member in a collapsed condition within the tank so as to thoroughly filter the gasolene when the same has reached a low level within said tank. Fig. 3 is a vertical section taken through the center of a modified form of the filter, the same being applied to a horizontally disposed tube or pipe utilized for conveying gasolene.

Referring by numerals to the accompanying drawings, and particularly to the construction illustrated in Figs. 1 and 2, 10 designates a gasolene supply tank, 11 a sediment trap at the bottom thereof and 12 the sediment discharge valve. Leading through the side wall of the sediment trap and upwardly into the tank 10 is a pipe or tube 13 which is for the purpose of conveying gasolene from the tank to the carbureter or point of use, and the inlet end of this tube occupies a plane slightly above the plane occupied by the bottom of the tank 10. Attached in any suitable manner to the inlet end of this pipe is the lower one of a series of collapsible hollow disks 14, the same being connected to one another bellows-like. These disks are preferably constructed of fine wire gauze, chamois-skin or a suitable fabric, and connected to the upper one of said disks is the lower end of a rod 15 that extends through a bearing in the top of the tank 10. By manually reciprocating this rod the series of disks 14 are alternately opened and closed, thereby thoroughly washing the sediment from the exterior surfaces of the sections of filtering material composing said disks.

In Fig. 1 the disks are shown expanded or open to their limit, and in Fig. 2 said disks are shown collapsed. When collapsed, as seen in Fig. 2 the disks occupy a plane immediately above the bottom of the tank, and therefore are in position to thoroughly filter the gasolene when the same reaches a low level within the tank. Water and sediment contained in the gasolene accumulates on the bottom of the tank and passes from thence into the trap from whence it is discharged at suitable intervals by opening the valve 12.

In the modified construction illustrated in Fig. 3 16 designates a horizontally disposed cylinder to one end of which leads an inlet pipe 17, and leading from the opposite end is an outlet pipe 18. A depending sediment trap 19 is fixed to the underside of this casing 16, said trap being provided with a sediment discharge valve 20. Connected to the end of the outlet pipe 18 within the cylinder 16 is one of a series of hollow flexible disks 21, preferably formed of chamois-skin, fine wire netting or fabric and connected to the opposite one of this series of filtering disks is the inner end of a rod 22 that extends through a suitable stuffing box in one end of the casing 16, said rod being for the purpose of expanding and collapsing the filtering disks to cleanse the same.

The form of filter shown in Fig. 3 and just described is particularly applicable for tubes or pipes utilized for conveying gasolene from a tank to a carbureter, and this form of device is very compact and particularly designed for use on motor vehicles.

A gasolene filter of my improved construction is comparatively simple, can be readily combined with all forms of storage tanks, and by its use all scale and sediment is thoroughly removed from the gasolene before the latter enters the carbureter. By utilizing filtering disks of chamois-skin or like material all water is thoroughly filtered from the gasolene.

It will be readily understood that minor changes in the size, form and construction of the various parts of my improved filter can be made and substituted for those hereing shown and described without departing from the spirit of my invention, the scope of which is set forth in the appended claims.

I claim:

1. The combination with a gasolene tank sediment trap, of an outlet pipe leading through said sediment trap, the mouth of which outlet pipe occupies a plane above the top of the sediment trap, a series of hollow collapsible filtering elements attached to the mouth of the outlet pipe, and a rod attached to one of said filtering elements and extending to the exterior of the tank for collapsing and opening the entire series of filtering elements.

2. The combination with a gasolene tank having a sediment trap, which trap is provided with an outlet, of a gasolene discharge pipe leading through the sediment trap, the mouth of which discharge pipe occupies a plane above the bottom of the tank, a hollow, collapsible filtering element connected directly to the mouth of said discharge pipe, and means connected to said filtering element and extending to the exterior of the tank for collapsing and opening said filtering element, whereby all of the filtered gasolene within the collapsible filtering element may be expelled through said element to cleanse the same and dislodge the sediment on the exterior of said element.

3. The combination with a gasolene container having an outlet, of a hollow flexible filtering element connected to said outlet, and a rod connected to said element and extending to the exterior of the container for completely collapsing the same to expel all the filtered gasolene within said element and causing the same to pass through the material of which said element is formed to cleanse the same and remove the sediment from the exterior surface thereof.

4. The combination with a gasolene container having an outlet tube, of a series of connected hollow flexible members of filtering material one of which is connected to the outlet tube within the container, and means connected to one of the hollow filtering members and extending to the exterior of the container for simultaneously collapsing all of the hollow filtering members to expel the filtered gasolene from the interior of said members through the filtering material to cleanse the same.

In testimony whereof I hereunto affix my signature in the presence of two witnesses, this 4th day of May, 1912.

LIVINGSTON H. YOURTREE.

Witnesses:
M. P. SMITH,
M. A. HANDEL.